United States Patent [19]

Parramon et al.

[11] Patent Number: 5,760,159
[45] Date of Patent: Jun. 2, 1998

[54] REFLECTOR AS WELL AS PROCESS AND MEANS FOR ITS PRODUCTION

[75] Inventors: Jose Poch Parramon; Roland Glagla; Dirk Schmidt, all of Iserlohn, Germany; Maurizio Manilo Monticelli, Varese; Santo Lepore, Turin, both of Italy

[73] Assignees: Bakelite AG, Germany; Magneti Marelli S.p.A., Italy

[21] Appl. No.: 860,944

[22] PCT Filed: Oct. 25, 1996

[86] PCT No.: PCT/EP96/04633

§ 371 Date: Jun. 23, 1997

§ 102(e) Date: Jun. 23, 1997

[87] PCT Pub. No.: WO97/16752

PCT Pub. Date: May 9, 1997

[30] Foreign Application Priority Data

Nov. 1, 1995 [DE] Germany ............... 195 40 687.7

[51] Int. Cl.⁶ ............................................. C08G 64/00
[52] U.S. Cl. ............... 528/176; 528/193; 528/194; 528/271; 528/272
[58] Field of Search ................... 528/176, 193, 528/194, 271, 272

[56] References Cited

U.S. PATENT DOCUMENTS

| 4,318,962 | 3/1982 | Boucher ................. 428/458 |
| 5,143,964 | 9/1992 | Behar et al. ............. 524/400 |
| 5,260,368 | 11/1993 | Benkhoucha et al. ..... 524/494 |

*Primary Examiner*—Terressa Mosley
*Attorney, Agent, or Firm*—Bierman, Muserlian and Lucas

[57] ABSTRACT

In the reflector according to the invention based on unsaturated polyester resins the surface of the unworked piece has an average surface peak-to-valley height of less than 0.5 μm. It is produced by injection molding of a molding compound based on unsaturated polyester resins and subsequent application of a metal coating on that surface of the unworked piece which is to be reflecting wherein the polyester molding compound is free of fibers and styrene.

6 Claims, No Drawings

REFLECTOR AS WELL AS PROCESS AND MEANS FOR ITS PRODUCTION

SPECIFICATION

The present invention relates to reflectors comprising unworked pieces of synthetic material on whose surface portion intended for the reflection of rays, a metal layer is applied. Prior art (cf. Duroplaste, Kunststoff-Handbuch, Vol. 10, Hanser-Verlag, 2nd Edition, 1988, Pages 318–319) provides producing unworked pieces, i.e. reflectors not treated by vapor deposition, through injection molding or transfer molding of BMC molding compounds. BMC molding compounds are plastic compounds comprising unsaturated polyester resins, dissolved in styrene, curing agents, additives and reinforcement fibers.

However, the unworked pieces obtained do not have sufficient surface quality. The surfaces have peak-to-valley heights of 0.2 to 0.5 μm. They are therefore improved through additional lacquer/varnish treatment before the metal layer is applied. This treatment yields peak-to-valley heights of <0.1 μm.

Since the lacquer/varnish treatment of the unworked pieces represents an undesirable process step, an attempt is made to produce unworked pieces for reflectors with improved surface quality which can be treated directly by vapor deposition.

EP-A 0 634 605 discloses the production of reflectors with high surface quality by injection molding of an epoxy resin molding compound which comprises as the preferred filler a quartz-kaolin mixture and wollastonite. Apart from the fact that due to the hard filler materials this molding compound leads to increased mold and machine wear, our investigations have shown that such molding compounds show a shrinkage of approximately 0.7 to 1% during the curing. In addition, a surface peak-to-valley height of only 0.1 μm is attained.

It is therefore the task of the invention to describe a reflector in which the application of the metal coating on the unworked synthetic material piece (vapor deposition) can take place without the intermediate surface improvement in which the unworked piece during the curing experiences a markedly decreased shrinkage and a surface peak-to-valley height of less than 0.1 μm is obtained.

The solution of the task is accomplished through a reflector according to claims 1 to 3, through a process for its production according to claim 4 as well as through a molding compound according to claims 6 to 8.

It was found that the fibers of the BMC molding compound are one of the primary reasons for the poor surface quality of the products produced from it. But, on the other hand, the fibers are considered by experts in the field to be necessary in order to lend sufficient strength to the formed bodies (unworked pieces) produced from unsaturated polyesters. This applies all the more since it is apparent that the fillers used must be fine-particled and for that reason have only a minor reinforcing effect for that reason.

It was surprisingly found that it is also possible to achieve strengths with fiber-free molding compounds based on unsaturated polyesters which are sufficient for the dimensional stability of reflectors. These molding compounds are free of styrene. These are pourable polyester molding compounds comprising polyester resins, curing accelerators as well as fillers and additives. It has been found that after shaping and curing such molding compounds show an extremely small degree of shrinkage of approximately 0.3 to 0.6% and a high surface quality with peak-to-valley heights <0.1, in particular ≦0.06 μm if the fraction of filler materials is at least 50 percent by weight, the filler materials have a mean grain size of less than 10 μm and if the molding compound comprises additionally a thermoplastic material. These molding compounds are formed in a manner known per se through injection molding or transfer molding processes and unworked pieces having mean peak-to-valley heights of less than 0.1 μm, even of 0.06 μm and less are obtained. The application of a metal coating on the surface which is to be reflecting, is carried out in a manner known per se such as is also used in vapor deposition within the scope of the described prior art, however without intermediate lacquer/varnish treatment of the unworked piece, for example by direct vapor deposition of aluminum onto the unworked piece.

Binding agents in the molding compounds used according to the invention are crystalline or amorphous unsaturated polyester resins or polyester resin mixtures, preferred are mixtures with 0–60% amorphous and 40–100% crystalline polyester resin fractions, with a softening point between approximately 50°–110° C. Cocondensation products of bifunctional alcohols and bifunctional acids, where the alcohol as well as also the acid component can be ethylenically unsaturated. To the resins can be added small quantities (up to 8 percent by weight) of so-called cross-linking agents such as for example allyl esters. The preferred polyester resins are the resins disclosed in DE-A 21 53 782, which are produced by esterification of a mixture comprising 60–85 mole percent of alpha, beta-unsaturated dicarboxylic acids and 40–15 mole percent of one or several of the three isomeric phthalic acids with bivalent alcohols or alcohol mixtures. These polyesters are preferably used without additional polymerizing compounds, i.e. without additional cross-linkage agents.

The molding compounds according to the invention comprise furthermore 1–15 percent by weight of a thermoplastic material such as for example polyethylene, polypropylene, polyvinyl alcohol or polyvinyl acetate powder.

Further components are fillers as well as conventionally used curing agents and mold-release and parting means.

Fillers used according to the invention are no fiber or fiber or needle-form substances but grainy or amorphous fillers. Examples are chalks, preferably precipitated or amorphous chalks, aluminum hydroxide, kaolin, carbon black, zinc sulfide, barium sulfate, dolomite, titanium dioxide or talcum if they have a mean particle size of less than 10 μm. Curing agents are per se conventional organic peroxides such as are also used in curing conventional BMC molding compounds. Further auxiliary agents are mold-release and parting agents such as metal soaps or waxes. For the molding compounds thus the following composition results:

Unsaturated polyesters 10–30 percent by weight
Thermoplast 1–15 percent by weight
Filler materials 50–80 percent by weight
Curing agent 0.1–0.5 percent by weight
Mold-release and parting agent 0.5–2 percent by weight
Cross-linking agents 0–8 percent by weight Fabrication of the molding compounds takes place in a manner known per se by mixing the components, preferably in the fused mass process with subsequent granulation.

The pourable substances are plastified in a manner known per se and in conventional injection molding or transfer molding devices, formed and cured at temperatures in the range from 140° to 200° C. within 50 to 120 s.

The shrinkage occurring during the curing is approximately 0.3 to 0.6% and thus permits production of even complicated structures which are highly accurate to size. The flexural strength of the cured substances, tested according to ISO 178, are in the range of 80 to 100 MPa. The impact resistance tested according to ISO 179/1 eU is in the range from 4 to 6 kJ/m$^2$, and the notch-impact strength, tested according to ISO 179//1eU, is 1–2 kJ/m$^2$.

EXAMPLE

The percentage specifications of the mixture are specifications in percentage by weight relative to the total mixture.

The amorphous UP resin used is an amorphous unsaturated polyester based on terephthalic acid, fumaric acid, ethylene glycol, and neopentyl glycol (UP resin 9193 NO produced by DSM)

The crystalline UP resin used is a crystalline unsaturated polyester based on terephthalic acid, fumaric acid, ethylene glycol and butanediol (Palatal®M 606-21Z produced by BASF).

A molding compound is produced by mixing the following components:

- 6% amorphous UP resin
- 12% crystalline UP resin
- 7.5% polyethylene-polyvinyl acetate copolymer
- 0.3% cumene hydroperoxide
- 72.8% chalk having a grain size <10 μm
- 0.1% MgO
- 1.3% Ca stearate The pourable substance is plastified and formed into a reflector in a transfer molding device and cured at 160° C. The unworked reflector piece shows the following values:

Shrinkage: 0.5%

Flexural strength: 80 MPa

Impact strength: 4.6 KJ/m$^2$

Notch-impact strength: 1.3 KJ/m$^2$

Peak-to-valley height: 0.05 μm

We claim:

1. A reflector made of unsaturated polyester resin compositions free of fibers and styrene and the surface of the unworked piece before application of the reflecting metal film has an average surface peak-to-valley height of less than 0.1 μm.

2. A process for the production of a reflector of claim 1 comprising forming by injection molding or transfer molding of an unsaturated polyester resin composition free of fibers and styrene into an unworked piece and curing the same to obtain an unworked piece with an average surface peak-to-valley height of less than 0.1 μm and applying a metal film to the surface of the said piece.

3. A molding composition for the production of the reflector of claim 1 comprising unsaturated polyester resins and fillers with a mean particle size of less than 10 μm and free of fibers and styrene.

4. A molding composition of claim 3 further containing a thermoplastic material.

5. Reflector as stated in claim 1, characterized in that the surface of the unworked piece has an average surface peak-to-valley height of ≦0.06 μm.

6. Molding composition as stated in claim 3, characterized by the following composition:

Unsaturated polyester(s) 10–30 percent by weight

Thermoplast 1–15 percent by weight

Fillers 50–80 percent by weight

Curing agent(s) 0.1–0.5 percent by weight

Mold-release and parting agent 0.5–2 percent by weight

Cross-linking agent 0–8 percent by weight.

* * * * *